(12) United States Patent
Meng et al.

(10) Patent No.: US 11,378,726 B2
(45) Date of Patent: Jul. 5, 2022

(54) FILTER STRUCTURE, FILTER LAYER AND DISPLAY PANEL

(71) Applicant: BOE TECHNOLOGY GROUP CO., LTD., Beijing (CN)

(72) Inventors: Xianqin Meng, Beijing (CN); Wei Wang, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 194 days.

(21) Appl. No.: 16/641,711

(22) PCT Filed: Jan. 23, 2019

(86) PCT No.: PCT/CN2019/072858
§ 371 (c)(1),
(2) Date: Feb. 25, 2020

(87) PCT Pub. No.: WO2020/150934
PCT Pub. Date: Jul. 30, 2020

(65) Prior Publication Data
US 2021/0149096 A1    May 20, 2021

(51) Int. Cl.
*G02B 5/20* (2006.01)
*G02F 1/1335* (2006.01)

(52) U.S. Cl.
CPC ....... *G02B 5/201* (2013.01); *G02F 1/133514* (2013.01)

(58) Field of Classification Search
CPC ........... G02F 1/133521; G02F 2203/15; G02F 2203/055; G02B 5/28; H01L 27/32; H01L 51/5265
See application file for complete search history.

(56) References Cited

U.S. PATENT DOCUMENTS 6,778,241 B1 * 8/2004 Arai .................. G02F 1/133555
349/114
7,875,947 B2    2/2011 Moon et al.
(Continued)

FOREIGN PATENT DOCUMENTS

CN        101576679 A    11/2009
CN        104090411 A    10/2014
(Continued)

OTHER PUBLICATIONS

Second Office Action issued by the Chinese Patent Office in the priority Chinese application No. 201980000079.9 dated Mar. 22, 2021.

*Primary Examiner* — Michael H Caley
*Assistant Examiner* — Jonathan Y Jung
(74) *Attorney, Agent, or Firm* — Dilworth & Barrese, LLP.; Michael J. Musella, Esq.

(57) ABSTRACT

The present disclosure provides a filter structure, a filter layer and a display panel. The filter structure includes a first transflective layer, a second transflective layer and a transparent film between the first transflective layer and the second transflective layer. The filter structure is configured to make light of a specific wavelength range in incident light incident from the first transflective layer into the filter structure be emergent from the second transflective layer by adjusting at least one of a thickness and the refractive index of the transparent film, a thickness and the refractive index of the first transflective layer, and a thickness and the refractive index of the second transflective layer, and make a transmittance of the light of the specific wavelength range be not less than 90%, by adjusting at least one of the thickness, the refractive index, and an extinction coefficient of the second transflective layer.

18 Claims, 8 Drawing Sheets

(56) References Cited

U.S. PATENT DOCUMENTS

| | | | |
|---|---|---|---|
| 2009/0040440 A1* | 2/2009 | Park | G02B 5/286 |
| | | | 349/106 |
| 2010/0091225 A1 | 4/2010 | Cho et al. | |
| 2013/0188253 A1* | 7/2013 | Nakai | G02B 5/28 |
| | | | 359/584 |
| 2015/0338675 A1* | 11/2015 | Zhang | G02F 1/133516 |
| | | | 156/60 |
| 2016/0231482 A1* | 8/2016 | Hasegawa | G02B 5/208 |
| 2017/0059887 A1* | 3/2017 | Park | H01S 5/2013 |
| 2017/0082892 A1* | 3/2017 | Chung | G02F 2/02 |
| 2017/0123270 A1* | 5/2017 | Neveux | G02F 1/133602 |
| 2019/0107726 A1* | 4/2019 | Phillips | G02B 5/26 |

FOREIGN PATENT DOCUMENTS

| | | |
|---|---|---|
| CN | 107390418 A | 11/2017 |
| CN | 108258008 A | 7/2018 |
| CN | 108319064 A | 7/2018 |
| CN | 109188775 A | 1/2019 |
| TW | 200848841 A | 12/2008 |
| TW | I361487 B | 4/2012 |

\* cited by examiner

FIG. 10B

FILTER STRUCTURE, FILTER LAYER AND DISPLAY PANEL

TECHNICAL FIELD

At least one embodiment of the present disclosure relates to a filter structure, a filter layer and a display panel.

BACKGROUND

Display devices such as traditional liquid crystal displays (LCD) and organic light emitting diode (OLED) displays included in the color display field all adopt traditional color filter substrates to implement red, green, and blue color display.

SUMMARY

At least one embodiment of the present disclosure relates to a filter structure, a filter layer and a display panel. The filter structure provided by the embodiment of the present disclosure can not only transmit light of the specific wavelength range, which has the transmittance not less than 90%, but also make the light of the specific wavelength range have a narrower spectrum.

At least one embodiment of the present disclosure provides a filter structure, which includes a first transflective layer; a second transflective layer opposite to the first transflective layer, a refractive index of the second transflective layer being substantially the same as a refractive index of the first transflective layer; and a transparent film located between the first transflective layer and the second transflective layer, and in contact with surfaces of the first transflective layer and the second transflective layer, a refractive index of the transparent film being smaller than that of the first transflective layer and the second transflective layer, where the filter structure is configured to make light of a specific wavelength range in incident light that is incident from the first transflective layer into the filter structure be emergent from the second transflective layer by adjusting at least one of a thickness and the refractive index of the transparent film, a thickness and the refractive index of the first transflective layer, and a thickness and the refractive index of the second transflective layer, and make a transmittance of emergent light of the specific wavelength range be not less than 90%, by adjusting at least one of the thickness, the refractive index, and an extinction coefficient of the second transflective layer.

In some examples, an optical thickness of the transparent film and a central wavelength of the light of the specific wavelength range satisfy a formula below: $\lambda=2nh/m$, $m=k+(\varphi 1+\varphi 2)/2\pi$, $k=0, 1, 2 \ldots$, where, nh is an optical thickness of the transparent film, n is the refractive index of the transparent film; h is the thickness of the transparent film, k is an interference order; $\varphi 1$ and $\varphi 2$ are respectively reflection phases of the first transflective layer and the second transflective layer; and $\lambda$ is the central wavelength of the light of the specific wavelength range.

In some examples, the refractive index of the first transflective layer and the refractive index of the second transflective layer are in a range of about 3.5 to 4.5.

In some examples, the thickness of the first transflective layer and the thickness of the second transflective layer are in a range of about 200 angstroms to 400 angstroms.

In some examples, an extinction coefficient of the first transflective layer and the extinction coefficient of the second transflective layer are not greater than 0.1.

In some examples, the refractive index of the transparent film is 1.3 to 2.0.

In some examples, the thickness of the transparent film is in a range of 1600 angstroms to 2800 angstroms.

In some examples, the thickness of the first transflective layer is equal to the thickness of the second transflective layer.

In some examples, a material of the first transflective layer is the same as a material of the second transflective layer.

In some examples, the material of the first transflective layer and the material of the second transflective layer include metal or silicon; or the first transflective layer and the second transflective layer both include multiple transparent dielectric films, the multiple transparent dielectric films include first optical films and second optical films which have a count of N and are alternately arranged, where, N is an even number; and a refractive index of each of the first optical films is larger than a refractive index of each of the second optical films.

In some examples, the light of the specific wavelength range is monochromatic light, and the monochromatic light is one of red light, green light, blue light, cyan light, yellow light and magenta light.

At least one embodiment of the present disclosure provides a filter layer, which includes a plurality of filter structures arranged in an array, each of the filter structures is the filter structure in any example as mentioned above, and an arrangement direction of the plurality of filter structures is parallel to a plane where the transparent film is located.

At least one embodiment of the present disclosure provides a display panel, which includes the filter layer as mentioned above.

In some examples, the filter layer is configured to exit light of specific wavelength ranges of different colors, and the plurality of filter structures included in the filter layer and a plurality of sub-pixels included in the display panel are arranged in one-to-one correspondence.

In some examples, the display panel includes a red sub-pixel, a green sub-pixel, a blue sub-pixel, a cyan sub-pixel, a yellow sub-pixel and a magenta sub-pixel, and the filter layer is configured to exit red light, green light, blue light, cyan light, yellow light and magenta light; or, the display panel includes a red sub-pixel, a green sub-pixel and a blue sub-pixel, and the filter layer is configured to exit red light, green light and blue light.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

In the study, an inventor of the present application found that: a conventional color filter substrate implements emergence of red light, green light and blue light (RGB light) by filtering white incident light, so approximately ⅔ of the white incident light will be absorbed by the color filter substrate, resulting in a low transmittance. In the process of filtering the white light with a general reflective or transmissive photonic crystal color filter as a filter structure, the reflective or transmissive photonic crystal color filter has relatively a low reflectance or transmittance, which leads to excessively high power consumption of a display device including the filter structure, or phenomena in a spectrum of emergent light such as too large or too small full width at half maximum, and disturbance peak interference, causing low color purity of the display device. In addition, display of three primary colors of red, green and blue in the display field have gradually failed to meet demands for high color gamut display that restores true colors. Therefore, fabrication of a display device with characteristics such as high color gamut, high color purity and low power consumption is one of important trends in the display field.

Embodiments of the present disclosure provide a filter structure, a filter layer and a display panel. The filter structure includes: a first transflective layer; a second transflective layer opposite to the first transflective layer, a refractive index of the second transflective layer being substantially the same as a refractive index of the first transflective layer; and a transparent film, located between the first transflective layer and the second transflective layer, and in contact with surfaces of the first transflective layer and the second transflective layer, a refractive index of the transparent film being smaller than the refractive indexes of the first transflective layer and the second transflective layer. The filter structure is configured to make light of a specific wavelength range in incident light that is incident from the first transflective layer into the filter structure be emergent from the second transflective layer, by adjusting at least one of a thickness and the refractive index of the transparent film, a thickness and the refractive index of the first transflective layer, and a thickness and the refractive index of the second transflective layer, and make a transmittance of emergent light of the specific wavelength range be not less than 90%, by adjusting at least one of the thickness, the refractive index, and an extinction coefficient of the second transflective layer. The filter structure provided by the embodiment of the present disclosure can not only transmit light of the specific wavelength range, which has the transmittance not less than 90%, but also make the light of the specific wavelength range have a narrower spectrum.

Hereinafter, the filter structure, the filter layer and the display panel provided by the embodiments of the present disclosure will be described in conjunction with the accompanying drawings.

Figure 1A:
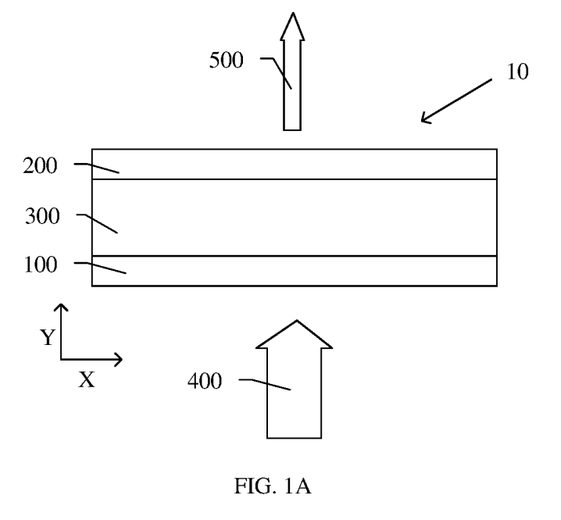
FIG. 1A is a schematic diagram of a filter structure provided by an embodiment of the present disclosure.

An embodiment of the present disclosure provides a filter structure, and FIG. 1A is a schematic diagram of a filter structure provided by an embodiment of the present disclosure. As shown in FIG. 1A, the filter structure 10 includes: a first transflective layer 100, a second transflective layer 200 and a transparent film 300. The second transflective layer 200 is opposite to the first transflective layer 100; the transparent film 300 is located between the first transflective layer 100 and the second transflective layer 200; and the transparent film 300 is in contact with surfaces of the first transflective layer 100 and the second transflective layer 200. A refractive index of the transparent film 300 is smaller than refractive indexes of the first transflective layer 100 and the second transflective layer 200; and the refractive index of the first transflective layer 100 is substantially the same as the refractive index of the second transflective layer 200, for example, a difference between the refractive index of the first transflective layer and the refractive index of the second transflective layer is not greater than 2%. In the embodiment of the present disclosure, the filter structure 10 is configured to make light 500 of a specific wavelength range (e.g., monochromatic light 500) in incident light 400 (e.g., white light 400) that is incident from the first transflective layer 100 into the filter structure 10 be emergent from the second transflective layer 200, by adjusting at least one of a thickness and the refractive index of the transparent film 300, a thickness and the refractive index of the first transflective layer 100, and a thickness and the refractive index of the second transflective layer 200, and make a transmittance of the emergent light 500 of the specific wavelength range be not less than 90%, by adjusting at least one of the thickness, the refractive index, and an extinction coefficient of the second transflective layer 200. The filter structure provided by the embodiment of the present disclosure can not only transmit the light of the specific wavelength range which has the transmittance not less than 90%, but also make the light of the specific wavelength range have a narrower spectrum.

For example, as shown in FIG. 1A, the filter structure 10 according to the embodiment of the present disclosure satisfies a multi-beam interference principle, to filter out near-monochromatic light 500 from the white light 400 incident in the filter structure 10.

For example, the filter structure 10 provided by the embodiment of the present disclosure is a multilayer film filter, and light of a wavelength satisfying interference resonance enhancement in the white light 400 incident from the first transflective layer 100 into the filter structure 10, that is, the monochromatic light 500 of the specific wavelength range, may be emergent from the second transflective layer 200. The white light 400 is incident into the filter structure 10 in a direction indicated by an arrow of a Y direction, and the monochromatic light 500 of the specific wavelength range is emergent from the filter structure 10 in the Y direction. Light in other wave bands in the white light 400 incident into the filter structure 10, except for the monochromatic light 500 of the specific wavelength range, is emergent from the first transflective layer 100, that is, the light in other wave bands is emergent from the filter structure 10 in a direction opposite to the arrow of the Y direction.

For example, when taken as a color filter layer, the filter structure 10 may make the light 500 of the specific wavelength range in the white light 400 incident into the filter structure 10 be emergent, while light in other wave bands be reflected back for secondary use, so as to improve a utilization ratio of light energy.

For example, in a case that the filter structure 10 is taken as a red light filter structure in a color filter layer of a display device, the light 500 of the specific wavelength range emergent from the red light filter structure is red light, while blue light and green light in the white light 400 incident into the red light filter structure is reflected back to the display device for secondary use.

For example, as shown in FIG. 1A, in the filter structure having multilayer films, an optical thickness of the transparent film 300 and a central wavelength of the emergent light 500 satisfy: $\lambda=2nh/m$, where, n is the refractive index of the transparent film 300, h is a geometric thickness of the transparent film 300 in the Y direction, a product of n and h is the optical thickness of the transparent film 300, and $\lambda$ is the central wavelength of the light 500 of the specific wavelength range. A parameter m satisfies a relationship below: $m=k+(\varphi 1+\varphi 2)/2\pi$, $k=0, 1, 2 \ldots$, where, k is an interference order, $\varphi 1$ and $\varphi 2$ are respectively reflection phases of the first transflective layer 100 and the second transflective layer 200.

It can be known from the relational expression of m that, m is determined by the interference order k and the reflection phases of the two transflective layers. Thus, the central wavelength of the monochromatic light 500 of the specific wavelength range emergent from the filter structure 10 is determined by the optical thickness of the transparent film 300, the interference order, and the reflection phases of the first transflective layer 100 and the second transflective layer 200. That is, the central wavelength of the monochromatic light 500 of the specific wavelength range is determined by the refractive index and the thickness of the first transflective layer 100, the refractive index and the thickness of the second transflective layer 200, and the refractive index and the thickness of the transparent film 300, and thus, at least one of the refractive index and the thickness of the first transflective layer 100, the refractive index and the thickness of the second transflective layer 200, and the refractive index and the thickness of the transparent film 300 of the filter structure 10 may be adjusted, so that the light 500 of the specific wavelength range in the incident light 400 incident from the first transflective layer 100 into the filter structure 10 is emergent from the second transflective layer 200, to achieve a filtering effect.

For example, full width at half maximum of the filter structure 10 is a passband width measured at ½ of a peak transmittance of the light 500 of the specific wavelength range.

For example, as shown in FIG. 1A, the first transflective layer 100 and the second transflective layer 200 may be metal layers, at this case, the full width at half maximum (FWHM) of the emergent light 500 of the filter structure 10 satisfies a formula below:

$$FWHM = \frac{2\lambda}{m\pi}\arcsin\left(\frac{1-\overline{R}}{2\sqrt{\overline{R}}}\right), \overline{R} = \sqrt{R_1 R_2}.$$

Where, R1 and R2 are respectively reflectances of the first transflective layer 100 and the second transflective layer 200. It can be known from the formula satisfied by the FWHM that: the higher the reflectances of the first transflective layer 100 and the second transflective layer 200, the higher m is (that is, the thicker the optical thickness of the transparent film 300), the smaller the full width at half maximum of the light 500 of the specific wavelength range, and the better the monochromaticity. Although narrower full width at half maximum may be obtained by increasing m, transmission peaks of lower-orders may also appear on both sides of a main peak of the emergent light; and in order to restrain the transmission peaks of lower-order from appearing on both sides of the main peak, m usually does not exceed 3.

For example, as shown in FIG. 1A, the first transflective layer 100 and the second transflective layer 200 may also be single dielectric layers (non-metal layers), at this case, the full width at half maximum (FWHM) of the emergent light 500 emergent from the filter structure 10 satisfies a formula below:

$$FWHM = \frac{2\lambda}{m\pi}\arcsin\left(\frac{T_{12}}{2}\right).$$

Where, $T_{12}$ is a transmittance of the first transflective layer 100 and the second transflective layer 200, by taking the transmittance of the first transflective layer 100 equal to the transmittance of the second transflective layer 200 here. Then, it can be known from the formula satisfied by the FWHM that: the lower the transmittance of the first transflective layer 100 and the second transflective layer 200, the smaller the full width at half maximum of the light 500 of the specific wavelength range, and the better the monochromaticity.

Figure 1B:
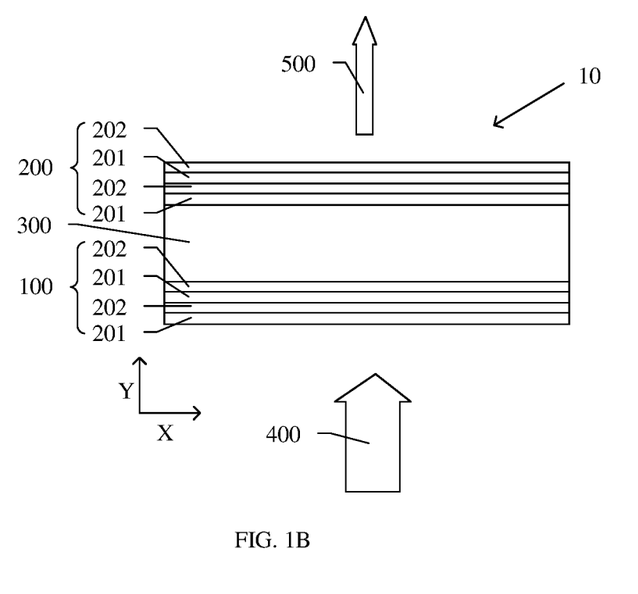
FIG. 1B is a schematic diagram of a filter structure provided by another example of an embodiment of the present disclosure.

For example, FIG. 1B is a schematic diagram of a filter structure provided by another example of an embodiment of the present disclosure. As shown in FIG. 1B, the filter structure in the example differs from the filter structure shown in FIG. 1A in that a first transflective layer 100 and a second transflective layer 200 of the filter structure in the example are both multiple transparent dielectric films, and the multiple transparent dielectric films include first optical films 201 and second optical films 202 which have a count of N and are alternately arranged, where, N is an even number, and a refractive index of each first optical film 201 is larger than a refractive index of each second optical film 202. That is, the first transflective layer 100 includes first optical films 201 and second optical films 202 which have a count of N and are alternately arranged, and the second transflective layer 200 includes first optical films 201 and second optical film 202 which have a count of N and are alternately arranged. FIG. 1B illustrates with N as 4.

In the example shown in FIG. 1B, a transmittance $T_{12}$ of the first transflective layer 100 and the second transflective layer 200 satisfies a formula below:

$$T_{12}=4n_L^{2x}n_G/n_H^{2x+1}.$$

A case that an effective refractive index of the first transflective layer 100 is equal to an effective refractive index of the second transflective layer 200, and a thickness of the first transflective layer 100 is equal to a thickness of the second transflective layer 200 is taken as an example. Where, $n_H$ and $n_L$ are respectively refractive indexes of the first optical film 201 and the second optical film 202, $n_G$ is a refractive index of a transparent film 300, and x is the total number of first optical films 201. Thus, full width at half maximum (FWHM) of emergent light 500 of the filter structure 10 satisfies a formula below:

$$FWHM = \frac{4n_L^{2x}n_g}{n_H^{2x+1}} * \frac{n_H - n_L}{m\pi(n_H - n_L - n_L/m)}.$$

For example, in the embodiment of the present disclosure, the refractive indexes, the thicknesses and extinction coefficients of the first transflective layer 100 and the second transflective layer 200 may be adjusted, so that the transmittance of the emergent light 500 of the specific wavelength range is greater than 90%.

For example, in this embodiment, the extinction coefficient of the first transflective layer 100 and the extinction coefficient of the second transflective layer 200 are not greater than 0.1, so that the transmittance of the emergent light 500 of the specific wavelength range is greater than 90%.

For example, in this embodiment, the extinction coefficient of the first transflective layer 100 is equal to the extinction coefficient of the second transflective layer 200.

For example, in this embodiment, the refractive index of the first transflective layer 100 and the refractive index of the second transflective layer 200 are in a range of about 3.5 to 4.5, so that the transmittance of the emergent light 500 of the specific wavelength range is greater than 90%.

For example, the thickness of the first transflective layer 100 and the thickness of the second transflective layer 200 are in a range of about 200 angstroms to 400 angstroms. Excessively large thicknesses of the two transflective layers will affect the transmittance, and a Fabry-Perot phenomenon is more serious (that is, the emergent light is non-monochromatic light); while excessively small thicknesses (e.g., 100 angstroms) of the two transflective layers will result in a relatively high transmittance of an entire wave band of incident white light 400, which cannot achieve a color filtering effect. Therefore, the thickness of the first transflective layer 100 and the thickness of the second transflective layer 200 are in the range of about 200 angstroms to 400 angstroms, which can not only make the transmittance of the emergent light 500 of the specific wavelength range greater than 90%, but also achieve the color filtering effect.

For example, in this embodiment, the thickness of the first transflective layer 100 is equal to the thickness of the second transflective layer 200. In a case that the first transflective layer 100 and the second transflective layer 200 both include multiple transparent dielectric films, calculation of the effective refractive indexes thereof are relatively simple, and processing and test verification are relatively simple, by making the thickness of the first transflective layer 100 equal to the thickness of the second transflective layer 200.

For example, in a case that the first transflective layer 100 and the second transflective layer 200 are single-layer films, materials of the two are the same so that the refractive indexes of the two are the same.

For example, the material of the first transflective layer 100 and the material of the second transflective layer 200 may include metal, such as silver or gold; or the material of the first transflective layer 100 and the material of the second transflective layer 200 may also include silicon or other non-metallic material with a high refractive index.

For example, when the first transflective layer 100 and the second transflective layer 200 both include multiple transparent dielectric films, by making effective refractive indexes of the two equal to each other, a process of designing and preparing the filter structure 10 may be relatively simple, without considering a problem of matching effective refractive indexes of the two transflective layers.

For example, in a case that the first transflective layer 100 and the second transflective layer 200 include multiple transparent dielectric films, materials of the first optical film 201 and the second optical film 202 in the multiple transparent dielectric films may include titanium dioxide and silica.

For example, the transparent film 300 has a refractive index of 1.3 to 2.0, and a thickness of 1800 angstroms to 2800 angstroms, so that the monochromatic light 500 of the specific wavelength range in the incident light 400 incident into the filter structure 10 is emergent from the second transflective layer 200.

For example, the transparent film 300 may be a transparent material such as glass or polymethyl methacrylate (PMMA).

For example, in the embodiment of the present disclosure, the central wavelength, the transmittance and the full width at half maximum of the light 500 of the specific wavelength range emergent after the white light 400 is incident into the filter structure 10 are obtained through modeling calculation and optimization based on a finite-difference time-domain (FDTD) method. A basic idea of the finite-difference time-domain method is to replace a first-order partial quotient of field quantity to time and space with a central difference quotient, and simulate a wave propagation process through recursion in a time domain, so as to obtain a field distribution. For example, in the finite-difference time-domain method, the space is meshed, time is calculated step by step, a wide-band steady-state continuous wave result is obtained from a time-domain signal, and a dispersion property of a material as well as electromagnetic field distribution and variation are accurately described in the wide band according to an existing material model.

Figure 2A:
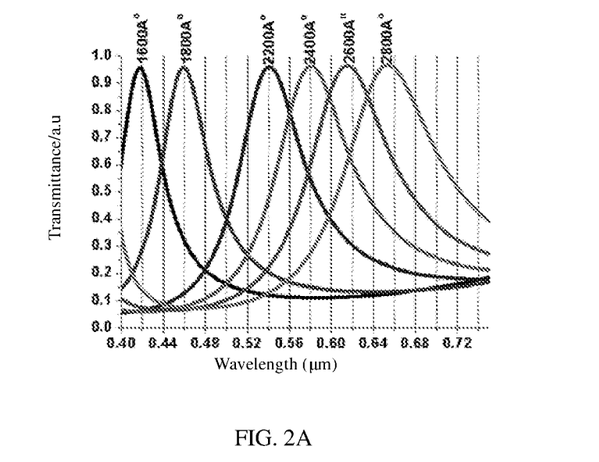
FIG. 2A is a spectrogram of transmitting monochromatic light of different specific wavelength ranges by adjusting a thickness of a transparent film provided by an embodiment of the present disclosure.

For example, in an example of this embodiment, the thickness of the transparent film may be adjusted so that the monochromatic light of the specific wavelength range in the white light incident into the filter structure is emergent from the filter structure. FIG. 2A is a spectrogram of transmitting monochromatic light of different specific wavelength ranges by adjusting the thickness of the transparent film. As shown in FIG. 2A, in this embodiment, the first transflective layer and the second transflective layer both have a thickness set to 200 angstroms, and a refractive index set to 4; the refractive index of the transparent film is set to 1.4, and the thickness of the transparent film is adjusted to change in a range of 1600 angstroms to 2800 angstroms. Because the transparent film has the refractive index unchanged while the thickness changed, the optical thickness of the transparent film is also changed. Thus, in a case where the white light is incident into different filter structures having transparent films with different thicknesses, central wavelengths of monochromatic light emergent after a microcavity effect occurs are also different from each other, so that emergent light of different specific wavelength ranges may be obtained by adjusting the thickness of the transparent film.

For example, as shown in FIG. 2A, the larger the thickness of the transparent film, the longer the central wavelength of the monochromatic light emergent.

Figure 2B:
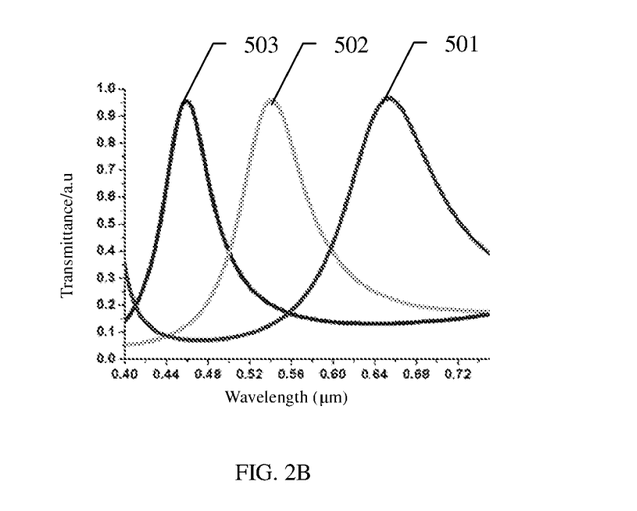
FIG. 2B is a spectrogram of transmitting red, green and blue monochromatic light by adjusting a thickness of a transparent film provided by an embodiment of the present disclosure.

For example, FIG. 2B is a spectrogram of transmitting red, green and blue monochromatic light by adjusting the thickness of the transparent film. As shown in FIG. 2B, in this embodiment, the first transflective layer and the second transflective layer both have a thickness set to 200 angstroms, and a refractive index set to 4; and the refractive index of the transparent film is set to 1.4. In a case where the thickness of the transparent film is respectively 2800 angstroms, 2200 angstroms or 1800 angstroms, emergent monochromatic light of specific wavelength ranges is respectively red light 501, green light 502 or blue light 503. It can be seen from FIG. 2B that, transmittances of the red light 501, the green light 502 and the blue light 503 are all greater than 90%. Parameters such as wave bands of the monochromatic light of the specific wavelength ranges as well as specific parameters of the filter structure are as shown in Table 1.

TABLE 1

| Transmission wave band (nm) | Thickness of transparent film (Å) | Transmittance (%) | Full width at half maximum (nm) |
|---|---|---|---|
| Blue light 440 to 480 | 1800 | 95 | 60 |
| Green light 520 to 560 | 2200 | 95 | 90 |
| Red light 640 to 780 | 2800 | 95 | 130 |

TABLE 1-continued

| Transmission wave band (nm) | Thickness of transparent film (Å) | Transmittance (%) | Full width at half maximum (nm) |
|---|---|---|---|

For example, in another example of this embodiment, the first transflective layer and the second transflective layer both have a thickness set to 200 angstroms, and a refractive index set to 4; the refractive index of the transparent film is set to 1.4, and the thickness of the transparent structure may also be adjusted so that magenta light, yellow light or cyan light is respectively emergent after white light is incident into different filter structures having transparent structures with different thicknesses.

For example, in a case where the thickness of the transparent film is respectively 2600 angstroms, 2500 angstroms or 2000 angstroms, emergent monochromatic light of the specific wavelength ranges is respectively magenta light, yellow light or cyan light. Parameters such as wave bands of the magenta light, the yellow light and the cyan light as well as specific parameters of the filter structure are as shown in Table 2.

TABLE 2

| Transmission wave band (nm) | Thickness of transparent film (Å) | Transmittance (%) | Full width at half maximum (nm) |
|---|---|---|---|
| Magenta light 600 to 640 | 2,600 | 95 | 120 |
| Yellow light 580 to 600 | 2,500 | 95 | 100 |
| Cyan light 480 to 500 | 2,000 | 90 | 80 |

Therefore, when a plurality of filter structures having transparent films with different thicknesses are arrayed to form a filter layer, not only the thicknesses of the transparent films included in the different filter structures may be adjusted so that only red light, green light and blue light are emergent, but also the thicknesses of the transparent films included in the different filter structures may be adjusted so that red light, green light, blue light, magenta light, yellow light and cyan light are emergent. Therefore, light of a specific wavelength range emergent from a certain filter structure is monochromatic light, and the monochromatic light may be one of red light, green light, blue light, cyan light, yellow light and magenta light.

For example, as shown in FIG. 2A and FIG. 2B as well as Table 1 and Table 2, the smaller the thickness of the transparent film, the smaller the full width at half maximum of the emergent light.

Figure 3A:
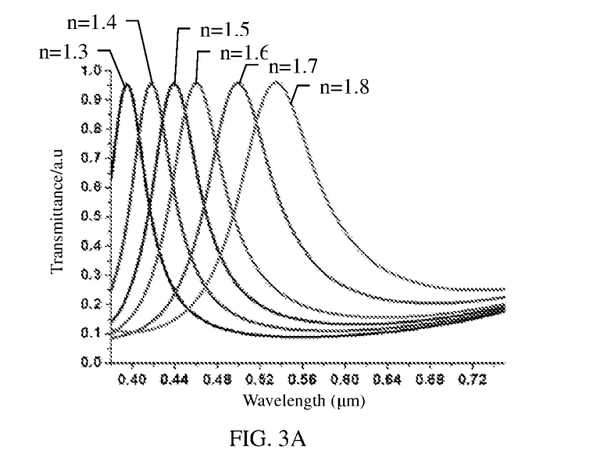
FIG. 3A to FIG. 3B are spectrograms of transmitting monochromatic light of different specific wavelength ranges by adjusting a refractive index of a transparent film provided by an embodiment of the present disclosure.
Figure 3B:
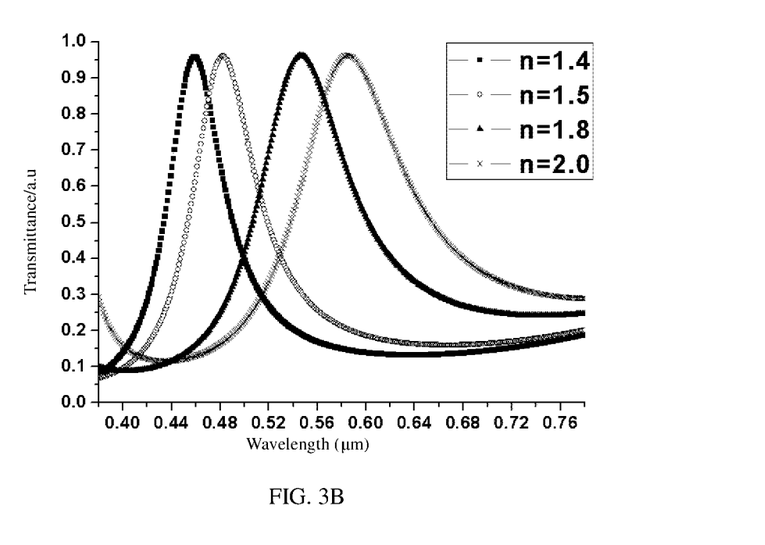

For example, in another example of the embodiment, the refractive index of the transparent film may be adjusted so that monochromatic light of a specific wavelength range in white light incident into the filter structure is emergent from the filter structure. FIG. 3A and FIG. 3B are spectrograms of transmitting monochromatic light of different specific wavelength ranges by adjusting the refractive index of the transparent film. As shown in FIG. 3A, in an example of this embodiment, the first transflective layer and the second transflective layer both have a thickness set to 200 angstroms, and a refractive index set to 4; the thickness of the transparent film is set to 1600 angstroms, and the refractive index of the transparent film is adjusted to change in a range of 1.3 to 2.0. Because the transparent film has the thickness unchanged while the refractive index changed, the optical thickness of the transparent film is also changed. Thus, after the white light is incident into different filter structures having transparent films with different refractive indexes, central wavelengths of monochromatic light emergent after a microcavity effect occurs are also different from each other, so that emergent light of different specific wavelength ranges may be obtained by adjusting the refractive index of the transparent film.

For example, as shown in FIG. 3A, in a case that the refractive index of the transparent film is changed in the range of 1.3 to 2.0, all transmittances of light of the respective specific wavelength ranges emergent from the filter structure are about 96%, and full width at half maximum of the emergent light varies with the refractive index of the transparent film.

For example, in a case that the refractive index of the transparent film is 1.4, a wavelength range of the emergent light is 420+/−25 nm, and the full width at half maximum of the emergent light spectrum is about 50 nm; in a case that the refractive index of the transparent film is 2.0, the wavelength range of the emergent light is 550+/−50 nm, and the full width at half maximum of the emergent light spectrum is about 100 nm; and thus, the smaller the refractive index of the transparent film, the narrower the full width at half maximum of the emergent light spectrum, the less the stray light, and the purer the color of emergent light of each specific wavelength range.

For example, as shown in FIG. 3B, in another example of the embodiment, the first transflective layer and the second transflective layer both have a thickness set to 200 angstroms, and a refractive index set to 4; the thickness of the transparent film is set to 2000 angstroms, and the refractive index of the transparent film is adjusted to change in a range of 1.4 to 2.0, so the optical thickness of the transparent film is also changed. The larger the refractive index of the transparent film, the longer the central wavelength of the monochromatic light emergent.

It can be known from FIG. 3A and FIG. 3B that, in a case that the thickness of the transparent film is unchanged, it may be difficult to make emergent light of different specific wavelength ranges include red light, green light, blue light, magenta light, cyan light and yellow light only by adjusting the refractive index of the transparent film, so, while the refractive index of the transparent film is adjusted, the thickness of the transparent film may be adjusted cooperatively so that the emergent light of different specific wavelength ranges includes red light, green light, blue light, magenta light, cyan light and yellow light.

For example, in addition to the thickness and the refractive index of the transparent film which affect the central wavelength of the emergent light of the specific wavelength range, the thicknesses and the refractive indexes of the first transflective layer and the second transflective layer also affect the central wavelength of the emergent light of the specific wavelength range. In this embodiment, the first transflective layer and the second transflective layer have an equal thickness and an equal refractive index.

Figure 4A:
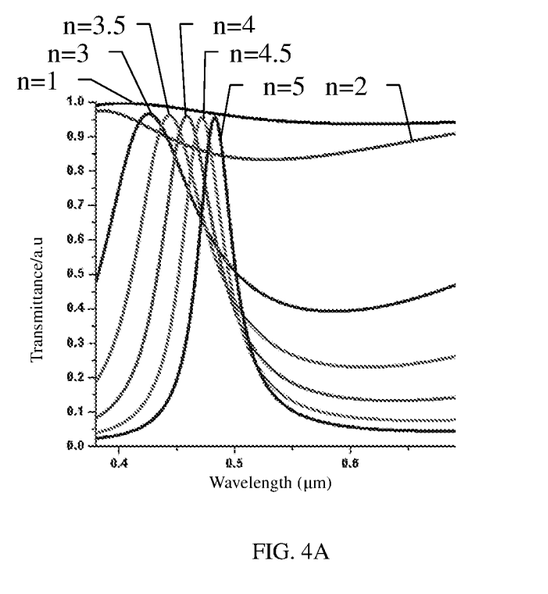
FIG. 4A is a schematic diagram of influence of a change in a refractive index of a second transflective layer on a central wavelength and full width at half maximum of emergent light of a specific wavelength range provided by an embodiment of the present disclosure.

For example, FIG. 4A is a schematic diagram of influence of a change in the refractive index of the first transflective layer and the second transflective layer on the central wavelength and the full width at half maximum of the emergent light of the specific wavelength range. As shown in FIG. 4A, the transparent film in the filter structure has a thickness of 2000 angstroms, and a refractive index of 1.40; and the first transflective layer and the second transflective layer have a thickness of 200 angstroms. In a case that the refractive index of the first transflective layer and the second transflective layer changes between 1 to 3, transmittances of light of respective wave bands in the white light incident into the filter structure are all greater than 40%, and the filter structure has no filtering effect. In a case that a range of the refractive index of the first transflective layer and the second transflective layer varies in a range about 3.5 to 5, only light of a specific wavelength range has a transmittance greater than 90%, while light of other wave bands has a transmittance less than 25%. Moreover, as the refractive index increases, the emergent light of the specific wavelength has a central wavelength gradually increased, and full width at half maximum gradually decreased, that is, the larger the refractive index of the first transflective layer and the second transflective layer, the narrower the full width at half maximum, and the less the stray light. In a case that the filter structure provided by this embodiment is applied to a display device, it is considered that the display device requires that: the purer the color purity is; the wider the color gamut is. Therefore, considering that a refractive index of a current material is difficult to reach 5, the range of the refractive index of the first transflective layer and the second transflective layer is about 3.5 to 4.5, so that the emergent light may have a transmittance greater than 90%.

Figure 4B:
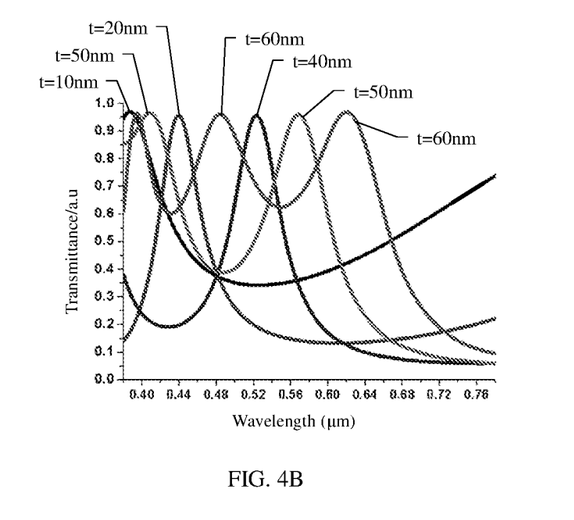
FIG. 4B is a schematic diagram of influence of a change of a thickness of a second transflective layer on a central wavelength of light of a specific wavelength range provided by an embodiment of the present disclosure.

For example, FIG. 4B is a schematic diagram of influence of a change in the thickness of the first transflective layer and the second transflective layer on the central wavelength and the full width at half maximum of the emergent light of the specific wavelength range. As shown in FIG. 4B, the transparent film in the filter structure has a thickness of 2000 angstroms, and a refractive index of 1.4; and the first transflective layer and the second transflective layer have a refractive index of 4.0. In a case that the first transflective layer and the second transflective layer have a thickness smaller than 200 angstroms, for example, 10 nanometers, transmittances of light of respective wave bands in the white light incident into the filter structure are all greater than 35%, and the filter structure has no filtering effect. In a case that the first transflective layer and the second transflective layer have a thickness larger than 400 angstroms, for example, 50 nm and 60 nm, the central wavelength of the emergent light of the specific wavelength range includes at least two values, so that the emergent light of the specific wavelength range is not monochromatic light. In a case that the first transflective layer and the second transflective layer have a thickness in a range of about 200 angstroms to 400 angstroms, only specific monochromatic light has a transmittance greater than 90%, while light of other wave bands has a transmittance less than 25%. Thus, in a case that the first transflective layer and the second transflective layer have a thickness in a range of about 200 angstroms to 400 angstroms, it may be guaranteed that the emergent light is monochromatic light, and the transmittance of the emergent light is relatively great.

It should be noted that, in FIG. 4A and FIG. 4B, an extinction coefficient of the first transflective layer and the second transflective layer is set to 0 during modeling, so that changes in the refractive index and the thickness of the first transflective layer and the second transflective layer have smaller influence on the transmittance; however, it is difficult to make the extinction coefficient in an actual material be 0, so in this embodiment, it is necessary to ensure the extinction coefficient of the first transflective layer and the second transflective layer to be as small as possible, for example, be smaller than 0.1, so that the transmittance of the emergent light of the filter structure can reach greater than 90%.

The changes in the refractive index and the thickness of the first transflective layer and the second transflective layer shown in FIG. 4A and FIG. 4B will influence reflection phases of the first transflective layer and the second transflective layer, so the refractive index and the thickness of the first transflective layer and the second transflective layer will influence the central wavelength of the emergent light of the specific wavelength range.

Figure 5A:
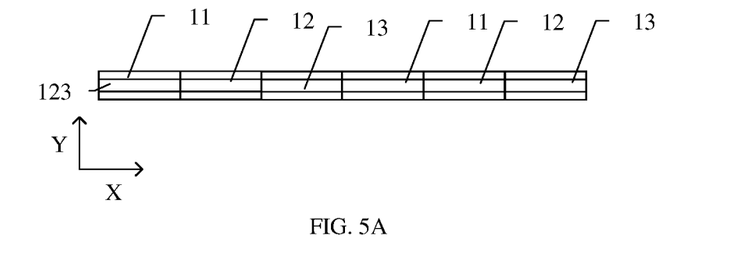
FIG. 5A is a partial cross-sectional schematic diagram of a filter layer provided by an embodiment of the present disclosure.
Figure 5B:
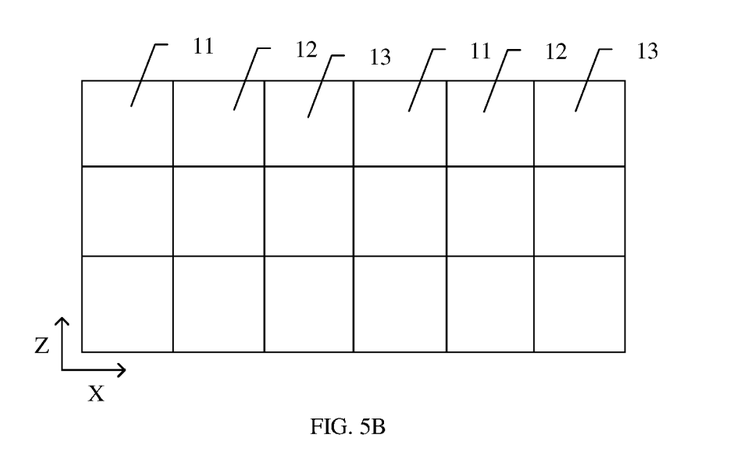
FIG. 5B is a schematic plan view of the filter layer shown in FIG. 5A.

For example, FIG. 5A is a partial cross-sectional schematic diagram of a filter layer provided by an embodiment of the present disclosure; and FIG. 5B is a schematic plan view of the filter layer shown in FIG. 5A. As shown in FIG. 5A and FIG. 5B, the filter layer 123 includes a plurality of filter structures arranged in an array according to any one of the above-described embodiments, and an arrangement direction of the plurality of filter structures is parallel to a plane where the transparent film is located, that is, the arrangement direction of the plurality of filter structures is parallel to an XZ plane.

For example, as shown in FIG. 5A and FIG. 5B, each filter structure in the filter layer 123 has a quadrangular shape, and the filter structures are arrayed along an X direction and a Y direction. The filter layer 123 includes a first filter structure 11 for transmitting red light, a second filter structure 12 for transmitting green light, and a third filter structure 13 for transmitting blue light.

For example, transparent films in the first filter structure 11, the second filter structure 12 and the third filter structure 13 have the same refractive index, but different thicknesses, so that light of different specific wavelength ranges in white light incident into the three filter structures is emergent. For example, the thickness of the transparent film in the first filter structure 11 is larger than the thickness of the transparent film in the second filter structure 12, and the thickness of the transparent film in the second filter structure 12 is larger than the thickness of the transparent film in the third filter structure 13.

For example, the transparent films in the first filter structure 11, the second filter structure 12 and the third filter structure 13 have the same thickness, but different refractive indexes, so that light of different specific wavelength ranges in white light incident into the three filter structures is emergent. For example, the refractive index of the transparent film in the first filter structure 11 is larger than the refractive index of the transparent film in the second filter structure 12, and the refractive index of the transparent film in the second filter structure 12 is larger than the refractive index of the transparent film in the third filter structure 13.

For example, the transparent films in the first filter structure 11, the second filter structure 12 and the third filter structure 13 have different thicknesses and different refractive indexes, so as to make optical thicknesses of the first filter structure 11, the second filter structure 12 and the third filter structure 13 different from each other, so that light of different specific wavelength ranges in white light incident into the three filter structures is emergent.

Figure 5C:
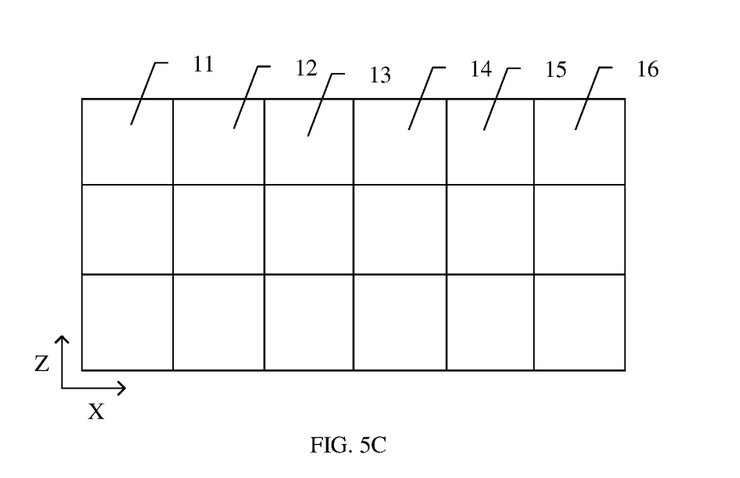
FIG. 5C is a partial plan schematic diagram of a filter layer provided by another example of an embodiment of the present disclosure.

For example, FIG. 5C is a partial plan schematic diagram of a filter layer provided by another example of an embodiment of the present disclosure. As shown in FIG. 5C, each filter structure in the filter layer 123 has a quadrangular shape, and the filter structures are arrayed along an X direction and a Y direction. The filter layer 123 includes a first filter structure 11 for transmitting red light, a second filter structure 12 for transmitting green light, a third filter structure 13 for transmitting blue light, a fourth filter structure 14 for transmitting cyan light, a fifth filter structure 15 for transmitting yellow light, and a sixth filter structure 16 for transmitting magenta light.

For example, transparent films in the first filter structure 11, the second filter structure 12, the third filter structure 13, the fourth filter structure 14, the fifth filter structure 15 and the sixth filter structure 16 have the same refractive index but different thicknesses, or have the same thickness but different refractive indexes, or have different refractive indexes and different thicknesses, to make optical thicknesses of the first filter structure 11, the second filter structure 12, the third filter structure 13, the fourth filter structure 14, the fifth filter structure 15 and the sixth filter structure 16 different from each other, so that light of different specific wavelength ranges in white light incident into the six filter structures is emergent. For example, the thicknesses of the transparent films in the six filter structures are arranged from large to small, resulting in a sequence below: the first filter structure 11, the sixth filter structure 16, the fifth filter structure 15, the second filter structure 12, the fourth filter structure 14 and the third filter structure 13.

Figure 5D:
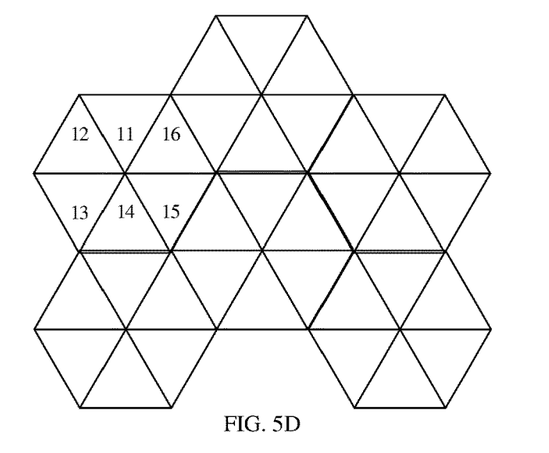
FIG. 5D is a partial plan schematic diagram of a filter layer provided by another example of an embodiment of the present disclosure.

For example, FIG. 5D is a partial plan schematic diagram of a filter layer provided by another example of an embodiment of the present disclosure. The example shown in FIG. 5D differs from the example shown in FIG. 5C in that, each filter structure in the filter layer 123 has a triangular shape; a first filter structure 11, a sixth filter structure 16, a fifth filter structure 15, a second filter structure 12, a fourth filter structure 14 and a third filter structure 13 constitute a unit; and the unit has a hexagonal shape. By adopting the arrangement shape provided by the example, uniformity of light emergent from the color filter layer is better, which improves a color display effect to a certain extent.

The color filter layer provided by the embodiment may be applied to a color display device such as a liquid crystal display, an organic light-emitting diode display, a color separation device, an augmented reality device and a virtual reality device.

Figure 6A:
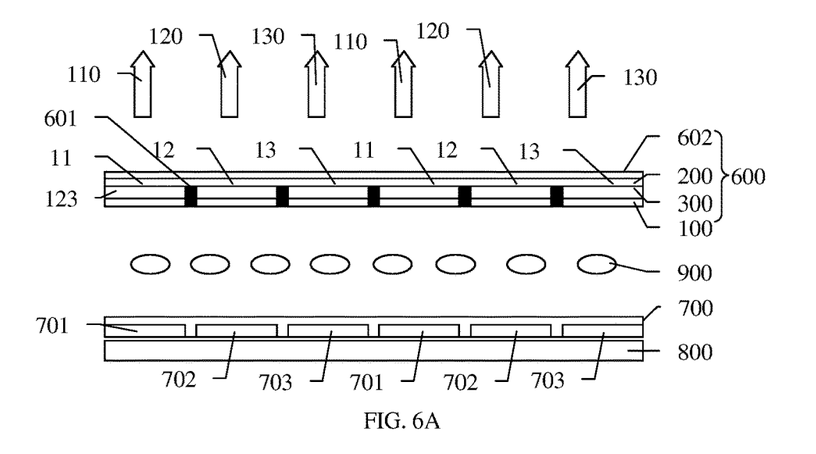
FIG. 6A is a partial structural schematic diagram of a display panel provided by an example of an embodiment of the present disclosure.

For example, FIG. 6A is a partial structural schematic diagram of a display panel provided by an example of an embodiment of the present disclosure. As shown in FIG. 6A, in this embodiment, the display panel is taken as a liquid crystal display panel, but it is not limited thereto, or it may also be a white organic light emitting diode (WOLED) that needs to be provided with a color filter layer.

For example, as shown in FIG. 6A, the display panel provided by this embodiment includes an array substrate 700, a color filter substrate 600, a liquid crystal layer 900 located between the array substrate 700 and the color filter substrate 600, and a backlight 800 located on a side of the array substrate 700 away from the liquid crystal layer 900.

For example, light emitted from the backlight 800 is white light.

For example, as shown in FIG. 6A, the display panel 20 provided by this embodiment includes a plurality of filter structures shown in FIG. 1, and the plurality of filter structures are arrayed to form a filter layer 123 of the display panel 20. The filter layer 123 is schematically provided on a side of a transparent substrate 602 that faces the liquid crystal layer 900. In this embodiment, the filter layer 123 including the plurality of filter structures is configured to transmit light of specific wavelength ranges of different colors, and thus, the filter layer 123 is a color filter layer. After white light emergent from the backlight 800 is incident into the filter layer 123, light of a specific wavelength range is emergent from the filter layer 123, and light of other wavelengthes is reflected back to a side of the filter layer 123 that faces the liquid crystal layer 900 for secondary use, so that a utilization ratio of light energy may be improved.

For example, as shown in FIG. 6A, the filter layer 123 includes three different filter structures, and a black matrix 601 is provided between adjacent filter structures. The array substrate 700 is provided with a plurality of sub-pixels, and each filter structure included in the filter layer 123 is provided corresponding to each sub-pixel included in the array substrate 700, that is, the plurality of filter structures included in the filter layer 123 and a plurality of sub-pixels included in the display panel are arranged in one-to-one correspondence.

For example, as shown in FIG. 6A, the filter layer 123 may include a first filter structure 11 for transmitting red light 110, a second filter structure 12 for transmitting green light 120, and a third filter structure 13 for transmitting blue light 130.

For example, assuming that the array substrate 700 includes a red sub-pixel 701, a green sub-pixel 702 and a blue sub-pixel 703, then the first filter structure 11 is provided corresponding to the red sub-pixel 701, the second filter structure 12 is provided corresponding to the green sub-pixel 702, and the third filter structure 13 is provided corresponding to the blue sub-pixel 703. The filter layer adopted in this embodiment may replace the traditional color filter layer; the red light, the green light and the blue light emergent from the filter layer have a transmittance not less than 90% and have a narrower frequency spectrum, which may reduce power consumption of the display panel and increase color saturation.

Figure 6B:
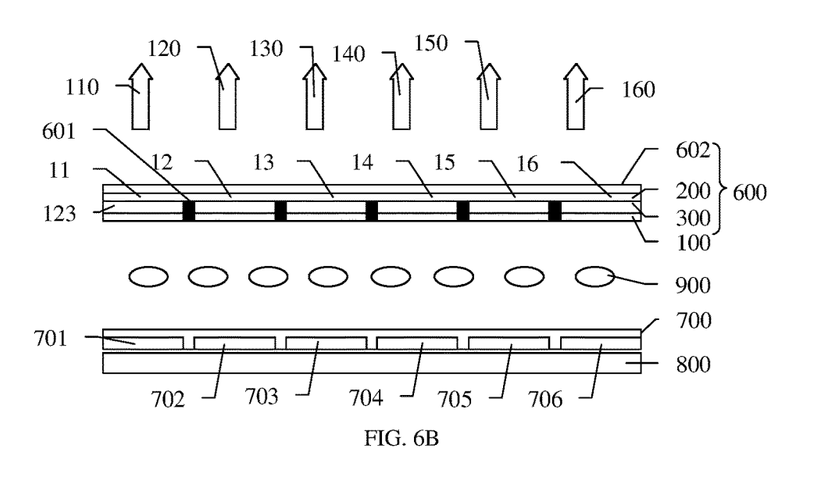
FIG. 6B is a partial structural schematic diagram of a display panel provided by another example of an embodiment of the present disclosure.

For example, FIG. 6B is a partial structural schematic diagram of a display panel provided by another example of an embodiment of the present disclosure. As shown in FIG. 6B, a filter layer 123 includes six different filter structures, and a black matrix 601 is provided between adjacent filter structures. The filter layer 123 may include a first filter structure 11 for transmitting red light 110, a second filter structure 12 for transmitting green light 120, a third filter structure 13 for transmitting blue light 130, a fourth filter structure 14 for transmitting cyan light 140, a fifth filter structure 15 for transmitting yellow light 150, and a sixth filter structure 16 for transmitting magenta light 160.

For example, the array substrate 700 includes a red sub-pixel 701, a green sub-pixel 702, a blue sub-pixel 703, a cyan sub-pixel 704, a yellow sub-pixel 705, and a magenta sub-pixel 706. Then the first filter structure 11 for transmitting the red light 110 is provided corresponding to the red sub-pixel 701, the second filter structure 12 for transmitting the green light 120 is provided corresponding to the green sub-pixel 702, the third filter structure 13 for transmitting the blue light 130 is provided corresponding to the blue sub-pixel 703, the fourth filter structure 14 for transmitting the cyan light 140 is provided corresponding to the cyan sub-pixel 704, the fifth filter structure 15 for transmitting the yellow light 150 is provided corresponding to the yellow sub-pixel 705, and the sixth filter structure 16 for transmitting the magenta light 160 is provided corresponding to the magenta sub-pixel 706. The color filter layer of the display panel in the example may transmit light of six colors, and thus, the display panel has performance of high color gamut and high color purity, which can achieve a better visual effect.

Figure 7:
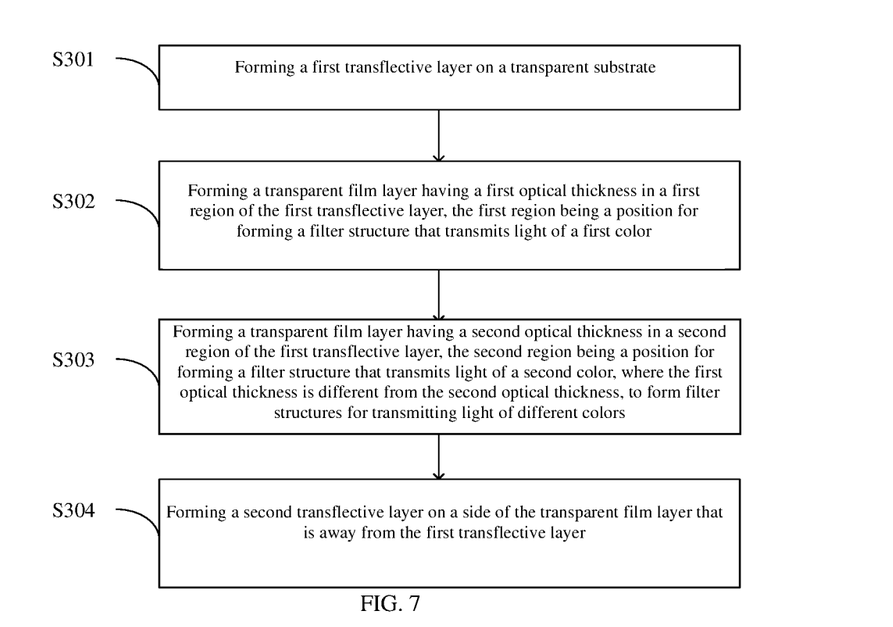
FIG. 7 is a schematic diagram of a method for fabricating a filter layer including a plurality of filter structures provided by an embodiment of the present disclosure.

For example, FIG. 7 is a schematic diagram of a method for fabricating a filter layer including a plurality of filter structures provided by another embodiment of the present disclosure. As shown in FIG. 7, the method for fabricating the filter layer includes steps below.

S301: forming a first transflective layer on a transparent substrate.

Figure 8A:
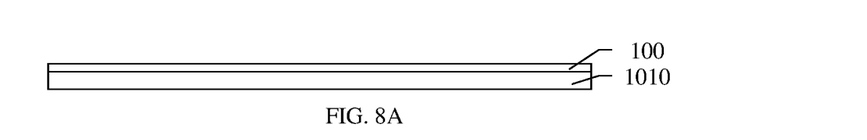
FIG. 8A is a cross-sectional schematic diagram of a transparent substrate and a first transflective layer provided by an embodiment of the present disclosure.
Figure 8B:
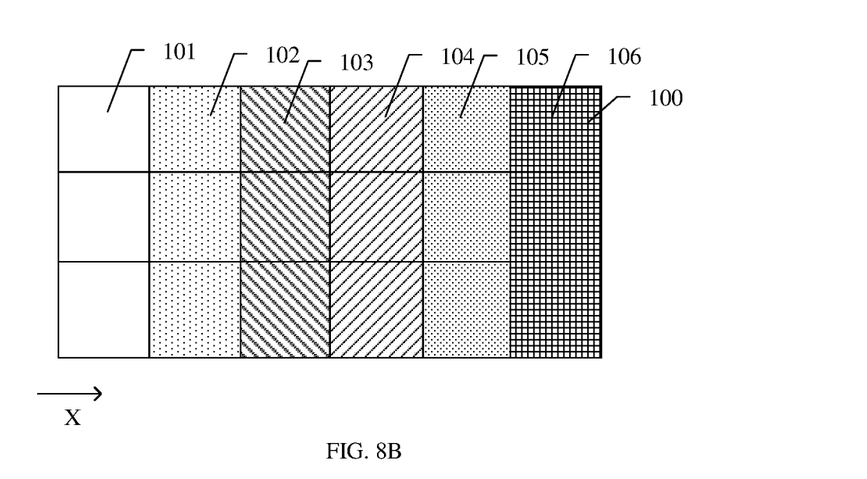
FIG. 8B is a partial planar structural schematic diagram of the first transflective layer shown in FIG. 8A.

For example, FIG. 8A is a cross-sectional schematic diagram of the transparent substrate and the first transflective layer provided by the embodiment of the present disclosure; and FIG. 8B is a partial planar structural schematic diagram of the first transflective layer shown in FIG. 8A.

For example, the transparent substrate 1010 may be a glass substrate, or may also be made of a transparent material such as polydimethylsiloxane (PDMS) or polymethyl methacrylate (PMMA), but it is not limited thereto, and may be selected according to actual needs.

For example, this embodiment schematically illustrates a method for forming the color filter layer shown in FIG. 5C. As shown in FIG. 8B, the first transflective layer 100 includes a plurality of regions, for example, it may include a first region 101, a second region 102, a third region 103, a fourth region 104, a fifth region 105 and a sixth region 106 to form transparent films having six different optical thicknesses. The above-described six regions are positions for forming filter structures that transmit light of six different colors. For example, the light of six different colors include red light, green light, blue light, cyan light, yellow light and magenta light. In order to clearly illustrate the six different regions, FIG. 8B represents different regions with different fill patterns.

It should be noted that, the number, shape and arrangement of different regions shown in FIG. 8B are only schematic, for example, the above-described six regions may also have the same triangular shape, and the above-described six regions having the triangular shape constitute a hexagon, that is, another example of this embodiment may also form the filter layer as shown in FIG. 5D.

This embodiment is not limited thereto, for example, the first transflective layer may also include three regions to form transparent films having three different optical thicknesses. The above-described three regions are positions for forming filter structures that transmit light of three different colors. For example, the light of three different colors includes red light, green light and blue light, that is, another example of this embodiment may also form the filter layer as shown in FIG. 5B. FIG. 8B to FIG. 10A are described by taking formation of the filter layer shown in FIG. 5C as an example.

S302: forming a transparent film having a first optical thickness in a first region of the first transflective layer, the first region being a position for forming a filter structure that transmits light of a first color.

Figure 9:
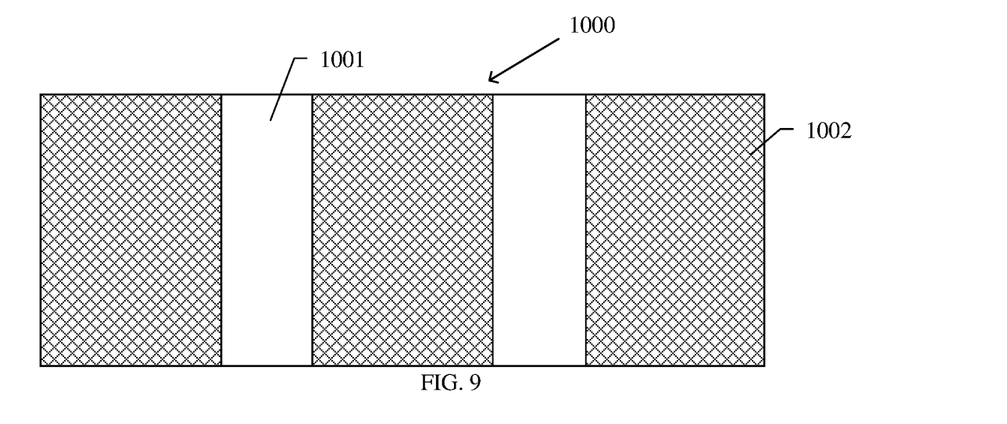
FIG. 9 is a schematic diagram of a mask provided by an embodiment of the present disclosure.
Figure 10A:
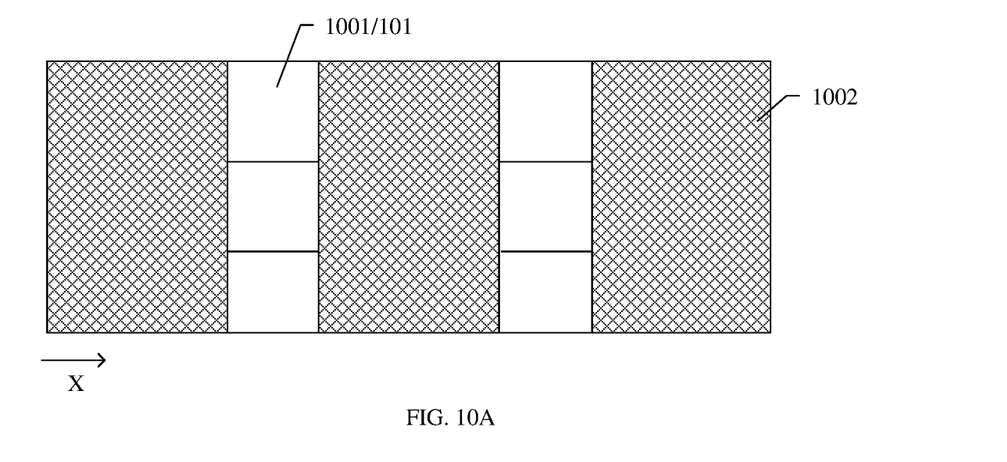
FIG. 10A to FIG. 10B are schematic diagrams of forming a transparent film on the first transflective layer with the mask shown in FIG. 9.
Figure 10B:
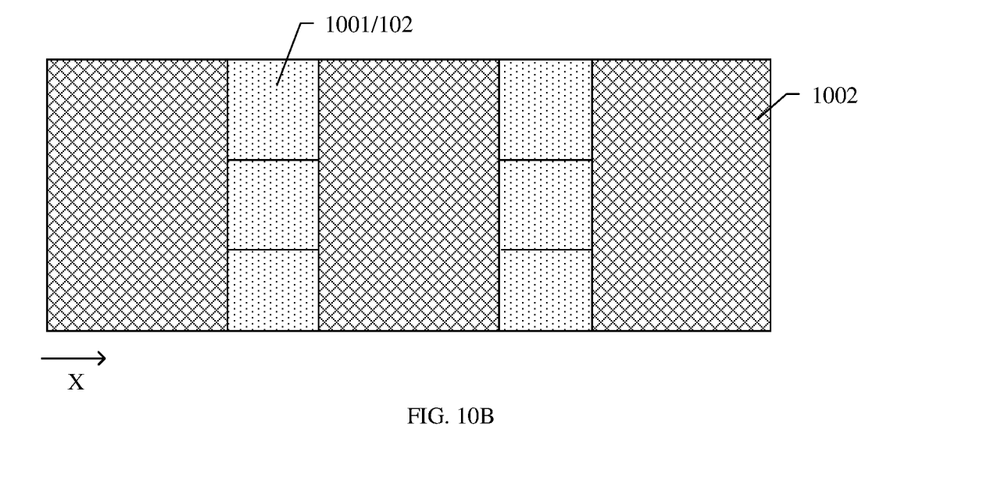

For example, FIG. 9 is a schematic diagram of a mask provided by this embodiment; and FIG. 10A to FIG. 10B are schematic diagrams of forming the transparent film on the first transflective layer with the mask shown in FIG. 9. As shown in FIG. 9, the mask 1000 includes an opening 1001 and a shielding region 1002; the opening 1001 is configured to expose a region where the transparent film is to be formed; and the shielding region 1002 is configured to shield other regions.

For example, as shown in FIG. 10A, with the mask 1000 having the opening 1001 as the mask, the transparent film having the first optical thickness is formed in the first region 101 of the first transflective layer that is exposed by the opening 1001. In a case where the first region 101 is exposed by the opening 1001, other regions are shielded by the shielding region 1002.

S303: forming a transparent film having a second optical thickness in a second region of the first transflective layer, the second region being a position for forming a filter structure that transmits light of a second color, where the first optical thickness is different from the second optical thickness, to form filter structures for transmitting light of different colors.

For example, as shown in FIG. 10A and FIG. 10B, a step of the forming the transparent film having the second optical thickness includes: moving the mask 1000 along an X direction to expose the second region 102 of the first transflective layer, and forming the transparent film having the second optical thickness in the second region 102. In a case where the second region 102 is exposed by the opening 1001, other regions are shielded by the shielding region 1002.

From a relational expression: λ=2nh/m of the optical thickness nh of the transparent film and a specific wavelength λ, it can be known that, different optical thicknesses of the transparent films may render different colors of monochromatic light of specific wavelength ranges emergent from the filter structure.

For example, a refractive index and/or a thickness of the transparent film having the first optical thickness is different from a refractive index and/or a thickness of the transparent film having the second optical thickness, which may make the first optical thickness different from the second optical thickness.

For example, the thickness of the transparent film having the first optical thickness is equal to the thickness of the transparent film having the second optical thickness; and the mask may be moved to respectively deposit transparent films of different materials in the first region and the second region of the first transflective layer, so that the refractive indexes of the transparent films located in two different regions are different from each other.

For example, the refractive index of the transparent film having the first optical thickness is equal to the refractive index of the transparent film having the second optical thickness; and the mask may be moved to respectively deposit transparent films of different thicknesses in the first region and the second region of the first transflective layer. This embodiment is not limited thereto, or a whole transparent film may also formed on the first transflective layer without the above-described mask, and the whole transparent film is etched to form transparent films of different thicknesses in different regions, for example, transparent films of different thicknesses may be formed in different regions by controlling parameters of an etching process.

For example, the mask 1000 is continuously moved along the X direction, so as to sequentially expose the third region, the fourth region, the fifth region and the sixth region of the first transflective layer to respectively form a transparent film having a third optical thickness, a transparent film having a fourth optical thickness, a transparent film having a fifth optical thickness, and a transparent film having a sixth optical thickness, thereby forming filter structures that transmit light of six different colors.

S304: forming a second transflective layer on a side of the transparent film that is away from the first transflective layer.

For example, an entire second transflective layer may be formed on the side of the transparent film that is away from the first transflective layer, or the second transflective layer may be formed only on a position where the transparent film is located.

The filter layer including the plurality of filter structures formed by using the method provided by the embodiment of the present disclosure can not only transmit the light of the specific wavelength range which has the transmittance not less than 90%, but also make the light of the specific wavelength range have a narrower spectrum. In addition, the color filter layer of the display panel formed in an example of this embodiment can transmit light of six colors, and therefore, the display panel has performance of high color gamut and high color purity, which can achieve a better visual effect.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto. The protection scope of the present disclosure should be based on the protection scope of the claims.

The invention claimed is:

1. A filter structure, comprising:
a first transflective layer;
a second transflective layer, opposite to the first transflective layer, a refractive index of the second transflective layer being substantially the same as a refractive index of the first transflective layer; and
a transparent film, located between the first transflective layer and the second transflective layer, and in contact with surfaces of the first transflective layer and the second transflective layer, a refractive index of the transparent film being smaller than that of the first transflective layer and the second transflective layer,
wherein the filter structure is configured to make light of a specific wavelength range in incident light that is incident from the first transflective layer into the filter structure be emergent from the second transflective layer by adjusting at least one of a thickness and the refractive index of the transparent film, a thickness and the refractive index of the first transflective layer, and a thickness and the refractive index of the second transflective layer, and make a transmittance of the light of the specific wavelength range be not less than 90%, by adjusting at least one of the thickness, the refractive index, and an extinction coefficient of the second transflective layer;
the thickness of the first transflective layer and the thickness of the second transflective layer are in a range of about 200 angstroms to 400 angstroms.

2. The filter structure according to claim 1, wherein an optical thickness of the transparent film and a central wavelength of the light of the specific wavelength range satisfy a formula below:

$$\lambda=2nh/m,\ m=k+(\varphi1+\varphi2)/2\pi,\ k=0,1,2\ldots,$$

where, n is the refractive index of the transparent film; h is the thickness of the transparent film, k is an interference order; φ1 and φ2 are respectively reflection phases of the first transflective layer and the second transflective layer; and λ, is the central wavelength of the light of the specific wavelength range.

3. The filter structure according to claim 1, wherein the refractive index of the first transflective layer and the refractive index of the second transflective layer are in a range of about 3.5 to 4.5.

4. The filter structure according to claim 1, wherein an extinction coefficient of the first transflective layer and the extinction coefficient of the second transflective layer are not greater than 0.1.

5. The filter structure according to claim 1, wherein the refractive index of the transparent film is 1.3 to 2.0.

6. The filter structure according to claim 5, wherein the thickness of the transparent film is in a range of 1600 angstroms to 2800 angstroms.

7. The filter structure according to claim 1, wherein the thickness of the first transflective layer is equal to the thickness of the second transflective layer.

8. The filter structure according to claim 3, wherein a material of the first transflective layer is the same as a material of the second transflective layer.

9. The filter structure according to claim 8, wherein the material of the first transflective layer and the material of the second transflective layer comprise metal or silicon; or the first transflective layer and the second transflective layer both comprise multiple transparent dielectric films, the multiple transparent dielectric films comprise first optical films and second optical films which have a count of N and are alternately arranged, where, N is an even number; and a refractive index of each of the first optical films is larger than a refractive index of each of the second optical films.

10. The filter structure according to claim 1, wherein the light of the specific wavelength range is monochromatic light, and the monochromatic light is one of red light, green light, blue light, cyan light, yellow light and magenta light.

11. A filter layer, comprising a plurality of filter structures arranged in an array, each of the filter structures being the filter structure according to claim 1,
wherein an arrangement direction of the plurality of filter structures is parallel to a plane where the transparent film is located.

12. A display panel, comprising the filter layer according to claim 11.

13. The display panel according to claim 12, wherein the filter layer is configured to exit light of specific wavelength ranges of different colors, and the plurality of filter structures included in the filter layer and a plurality of sub-pixels included in the display panel are arranged in one-to-one correspondence.

14. The display panel according to claim 13, wherein the display panel comprises a red sub-pixel, a green sub-pixel, a blue sub-pixel, a cyan sub-pixel, a yellow sub-pixel and a magenta sub-pixel, and the filter layer is configured to exit red light, green light, blue light, cyan light, yellow light and magenta light.

15. The display panel according to claim 13, wherein the display panel comprises a red sub-pixel, a green sub-pixel and a blue sub-pixel, and the filter layer is configured to exit red light, green light and blue light.

16. The filter structure according to claim 1, wherein an extinction coefficient of the first transflective layer and the extinction coefficient of the second transflective layer are not greater than 0.1, the refractive index of the transparent film is 1.3 to 2.0.

17. The filter structure according to claim 16, wherein the thickness of the transparent film is in a range of 1600 angstroms to 2800 angstroms.

18. A filter structure, comprising:
a first transflective layer;
a second transflective layer, opposite to the first transflective layer, a refractive index of the second transflective layer being substantially the same as a refractive index of the first transflective layer; and
a transparent film, located between the first transflective layer and the second transflective layer, and in contact with surfaces of the first transflective layer and the second transflective layer, a refractive index of the transparent film being smaller than that of the first transflective layer and the second transflective layer,
wherein the filter structure is configured to make light of a specific wavelength range in incident light that is incident from the first transflective layer into the filter structure be emergent from the second transflective layer by adjusting at least one of a thickness and the refractive index of the transparent film, a thickness and the refractive index of the first transflective layer, and a thickness and the refractive index of the second transflective layer, and make a transmittance of the light of the specific wavelength range be not less than 90%, by adjusting at least one of the thickness, the refractive index, and an extinction coefficient of the second transflective layer;
the refractive index of the transparent film is 1.3 to 2.0, the thickness of the transparent film is in a range of 1600 angstroms to 2800 angstroms.

\* \* \* \* \*